Figure 1:
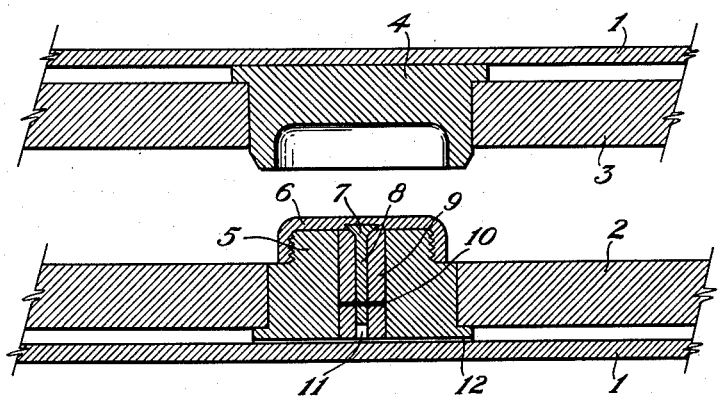

Dec. 23, 1958  G. W. WILCOX  2,865,052

VENTED MOLD FOR PLASTIC MATERIALS

Filed Oct. 4, 1955

United States Patent Office 2,865,052
Patented Dec. 23, 1958

2,865,052

VENTED MOLD FOR PLASTIC MATERIALS

Grayson W. Wilcox, New Canaan, Conn., assignor to Hooker Chemical Corporation, Niagara Falls, N. Y., a corporation of New York Application October 4, 1955, Serial No. 538,312

6 Claims. (Cl. 18—34)

This invention relates to molds for the molding of plastic materials. More particularly, it refers to improved molds which are provided with means for facilitating the release of entrapped gases during the molding period.

Difficulties are often encountered in the molding of many types of plastic articles due to the collection of gases in various parts of the mold cavity. These gases, which generally are a combination of air, steam, and other volatile materials, cannot escape during the time in which the mold is closed and the pressure and heat applied to the molding material. When gases are trapped in the cavity of a mold, they may prevent the plastic material from completely filling the cavity of the mold, thus making a piece which is imperfect because it contains a void. Sometimes these gases become entrapped under pressure in the molded piece so that when the mold is opened, the molded piece will blister. There are also gases formed by the volatilizing of elements of the plastic material itself, and in the case of some plastic materials, there are actually some volatile elements produced in the setting or curing of the material. When the mold is opened, even though the piece being produced does not contain voids and does not blister, these gases which are exuded from the surface of the molded piece which still clings to the mold build up a pressure which distorts the molded piece. This is called warping or bulging and is more pronounced in parts having relatively flat, thin sections such as a jar cap or a wall plate for electrical switches.

A common method for minimizing the problem of entrapped gas is called "breathing" the mold. This method comprises opening the mold to a limited degree when the plastic material has only partially set or cured to allow entrapped gases to escape. The mold is then closed again and the molding process completed. This breathing is only partially successfully and necessitates a longer molding cycle. In addition it usually requires very careful timing and often introduces other flaws in the piece such as weld marks.

It is an object of the present invention to provide a mold for the molding of plastic materials which contains a means for permitting the release of entrapped gases during the molding cycle. It is a further object of this invention to provide such a vented mold which may be used to produce plastic articles which do not contain such defects as cavities, blisters, warping or bulging, or other forms of distortion caused by the entrapment of gases during the molding period. It is a further object of this invention to provide such a vented mold which may be used to form plastic articles which do not contain such defects as cavities, blisters, warping, bulging or any other distortion without interrupting the molding cycle for the purpose of releasing entrapped gases.

It has now been found that entrapped gases in a mold which are responsible for the production of defective molded pieces may be released from the mold during the molding cycle by providing the mold with means for venting entrapped gases automatically to the atmosphere, and which at the same time contains the plastic material within the molding cavity.

More particularly, it has been found that by incorporating one or more valve assemblies in the mold, both the gases which are displaced ahead of the flowing plastic material as it fills the mold cavity and the gases which collect between the mold and the molded piece as the mold is opened may be released during the molding cycle, thus avoiding the difficulties generally encountered in the molding operation. The mold which is the subject of the present invention is so designed that when, during the molding cycle, the molded piece bulges or warps away from the face of the mold member to which it is attached when the mold is opened, it will automatically and simultaneously open the valve of a valve assembly to a predetermined degree, thus permitting the escape of the gases which cause distortion of the piece. The valve assembly comprises a valve having a valve head and a valve stem, and a valve frame therefor. The valve head is provided with a recess, or else extends beyond the valve seat or has other similar means which causes it and the plastic being molded to become interlocked so that the valve opens when the molded piece bulges. The valve allows gases being displaced by the incoming molten plastic material to be removed from the mold cavity by remaining open at its predetermined limit at the beginning of the molding cycle and until the flowing plastic material closes the valve.

Figure 2:
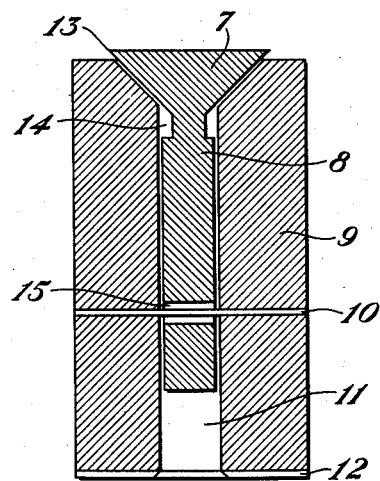
Figure 4:
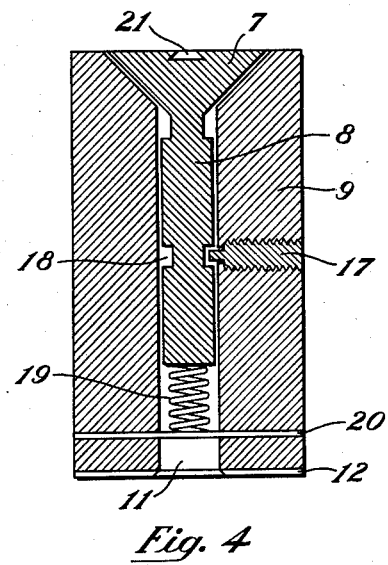
Figure 3:
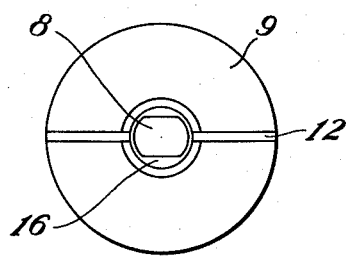

In order that the invention may be more easily understood it will be described with reference to the attached drawings. Figure 1 shows a general view of a mold of this invention which is suitable for molding threaded bottle caps showing a valve assembly of the present invention in the mold. Figure 2 shows an enlarged view of the valve assembly. Figure 3 shows an end view of the assembly, and Figure 4 shows an alternative design of the valve assembly.

Referring to Figure 1, a mold assembly is shown which consists of backing plates 1, mold frame members 2 and 3 which hold companion mold members 4 and 5 respectively; these jointly form a mold cavity which defines the plastic molded piece 6. Into the mold assembly there is incorporated the valve assembly of the present invention, said assembly being inserted into the thread-forming member 5 of the mold assembly and abutting upon an internal face of the mold cavity. The valve assembly comprises a valve having a valve head 7 and a valve stem 8, and a valve frame 9. The valve is placed within the valve frame 9 in such a manner that when the valve is closed, the head of the valve seats itself in the valve seat at the upper end of the valve so that the molten plastic material cannot enter the gas passages, thus rendering the valve useless. The valve head 7 is so designed that a part thereof extends into the mold cavity forming a recess with the valve frame. The cross pin 10 restricts movement of the valve stem 8. Space 11 and groove 12 are part of the escape path for gases passing through to the atmosphere.

Figure 2 shows an enlarged view of the valve assembly comprising a valve head 7 which projects slightly into the mold cavity, exposing a recess 13 designed in such a manner that the valve head becomes imbedded in the plastic material during the molding operation. The remainder of the valve assembly is so arranged that gases released by the plastic material pass between the valve head and the valve seat into the chamber 14. From there the gases pass down passages provided between the valve frame and the valve stem 8, through chamber 11, and through passages 12 to the atmosphere. The valve frame 9 has a cross pin 10 inserted therein which passes through a cylindrical hole or slot 15 in the valve stem.

The size of the hole 15 is larger than the diameter of the pin and determines the amount that the valve can open.

Figure 3 shows an end view of the assembly shown in Figure 2 and shows the end which does not contain the valve seat. The valve stem 8 contains passages 16 which extend from the base of the valve head to the bottom of the valve stem, forming a passage for gases to pass from chamber 14 to chamber 11. Either flats or grooves may be used along the internal surface of the valve frame to accomplish the same results.

Figure 4 shows alternative designs of the valve assembly. As shown herein, a set screw 17 having dog end which rides in annular groove 18 which has been cut into the valve stem replaces cross pin 10 and hole 15 in the valve stem shown in Figure 2. This arrangement allows the valve to turn in case the molded piece is to be turned while being removed from the molds, as in the case of a jar cap containing a molded thread. This arrangement allows the valve to be turned while still limiting the distance that the valve can open.

One of several methods may be utilized to keep the valve open until the plastic material reaches and closes it. One method is to mount the valve assembly in an inverted position so that the weight of the valve holds it open until the flowing material presses it closed. Another method is to provide a weak coil compression spring operating upon the valve stem having sufficient force to overcome the weight of the valve and holding it open, until the force of the plastic material closes it. A compression spring 19 and a supporting member therefor 20 may be used to cause the valve to remain normally opened unless acted upon by the incoming molten plastic material. Instead of providing the valve head with an under-cut as shown in Figure 2 the valve head may be provided with a recess 21 on the surface of the valve head exposed to the plastic material.

The method of operation of the above described valve assembly which is a subject of the present invention is as follows. During the molding operation the head of the valve and plastic material are movably attached. Consequently, when the mold is opened and the gases start to form between the molded piece and the part of the mold in which the plastic piece remains and to which it is fastened by virtue of the molded screw thread, the piece will begin to bulge away from that part of the mold due to the pressures of the gases formed. This initial movement of the plastic piece lifts the valve head, the plastic piece itself operating the valve. The degree of travel of the valve is determined by the clearance between the valve stem hole 15 and the cross pin 10 as shown in Figure 2 or by the dog-end set screw 17 and annular groove 18 arrangement shown in Figure 4 or any other suitable means known to the art. When the valve is thus opened the gases escape around it into the annular chamber 14, through the flats or grooves provided in either the valve frame or the valve stem, through the series of relief paths such as shown by 11 and 12, and out to the atmosphere. When the piece is finally ejected from the mold, only a small force is necessary to disengage the valve head.

One method of practicing the present invention which is well adapted for use in closed mold techniques commonly called transfer or plunger molding is to insert the valve assembly in a vertical position as shown in Figure 2 in order to exhaust gases pushed ahead of the flowing plastic material. In this case a light compression spring would be employed to keep the valve in a normally open position, which spring would be supported upon a cross pin. The spring exerts only slightly more than enough pressure to overcome the weight of the valve and hold it in "open" position. During operation, the molten plastic material will close the valve upon coming into contact with the valve head, thus preventing any material from flowing into the assembly and clogging it. When the mold is opened and the formed piece ejected, the force exerted to pull the piece off the valve head will aid in opening the valve in preparation for the molding of the next piece.

Among the types of plastic molding materials which may be molded in accordance with this invention are the phenolic resins, polystyrene, polyethylene, vinyl chloride, vinylidene chloride, polyester molding compounds, polyamides, urea, and melamine molding compounds. The present invention may also be used in other types of molds wherever the gassing problem exists.

Among such molds are injection molds, compression molds, transfer molds, etc. In addition, numerous other variations in details of structure and procedure may be readily devised by those skilled in the art which will embody the principals disclosed herein without departing from the spirit and the scope of the invention as hereinafter claimed.

I claim:

1. A mold for molding plastic materials which comprises companion mold members with recesses jointly to form a cavity, an aperture to said cavity providing means for the admission of plastic material thereinto, and a valve assembly for venting gases from said mold cavity during the molding operation which comprises a valve having a valve stem and a valve head, a valve frame adapted to receive said valve and faced at one end to seat said valve head, said valve assembly having means for interlocking the valve head and plastic material, means for transferring gases from said mold cavity through said valve assembly to the atmosphere, means for limiting the travel of said valve stem within said valve frame, and means for maintaining said valve in a normally open position.

2. A mold according to claim 1 wherein the means for interlocking the plastic and the valve head is an undercut formed by an extension of the valve head beyond the valve seat.

3. A mold according to claim 1 wherein the means for interlocking the plastic and the valve head is a recess in the center of the valve head.

4. A valve assembly for venting entrapped gases from a mold having companion mold members for molding plastics, said valve assembly comprising: a valve frame and a valve having a valve stem and a valve head, said valve frame having an opening for seating the valve head and for receiving the valve stem, said opening providing a passage between the valve stem and valve frame and along their length to provide for escape of gases, said valve stem having a recess for receiving a cross pin projecting from the valve frame, said recess and cross pin cooperating to limit the travel of the valve stem in the valve frame, said valve head having surfaces coacting with the valve frame and having other surfaces forming an undercut externally of the valve frame weherby the plastic being molded is interlocked with the valve head so that the valve is actuated by the plastic being cured as the vent gases become trapped.

5. The valve assembly according to claim 4 wherein the external surface for interlocking the plastic and valve head is an undercut formed by an extension of the valve beyond the valve seat.

6. The valve assembly according to claim 4 wherein the external surface for interlocking the plastic and valve head is a recess in the valve head.

References Cited in the file of this patent

UNITED STATES PATENTS

| 1,823,180 | White et al. | Sept. 15, 1931 |
| 1,826,945 | McKay et al. | Oct. 13, 1931 |
| 2,378,586 | Schultz | June 19, 1945 |

UNITED STATES PATENT OFFICE

CERTIFICATE OF CORRECTION

Patent No. 2,865,052                          December 23, 1958

Grayson W. Wilcox

It is hereby certified that error appears in the printed specification of the above numbered patent requiring correction and that the said Letters Patent should read as corrected below.

Column 4, line 57, for "weherby" read -- whereby --; line 62, after "valve" insert -- head --.

Signed and sealed this 15th day of December 1959.

(SEAL)
Attest:

KARL H. AXLINE
Attesting Officer

ROBERT C. WATSON
Commissioner of Patents